(12) United States Patent
Park et al.

(10) Patent No.: US 12,456,761 B2
(45) Date of Patent: Oct. 28, 2025

(54) APPARATUS FOR ANALYZING BATTERY CASE

(71) Applicant: LG ENERGY SOLUTION, LTD., Seoul (KR)

(72) Inventors: Kwangyeon Park, Daejeon (KR); Nak Hee Choi, Daejeon (KR); Byoungsoo Lee, Daejeon (KR)

(73) Assignee: LG ENERGY SOLUTION LTD., Seoul (KR)

( * ) Notice: Subject to any disclaimer, the term of this patent is extended or adjusted under 35 U.S.C. 154(b) by 31 days.

(21) Appl. No.: 18/035,473

(22) PCT Filed: Jul. 26, 2022

(86) PCT No.: PCT/KR2022/010954
§ 371 (c)(1),
(2) Date: May 4, 2023

(87) PCT Pub. No.: WO2023/008874
PCT Pub. Date: Feb. 2, 2023

(65) Prior Publication Data
US 2023/0420748 A1   Dec. 28, 2023

(30) Foreign Application Priority Data
Jul. 30, 2021   (KR) .......................... 10-2021-0100278

(51) Int. Cl.
*H01M 10/42* (2006.01)
*G01M 3/32* (2006.01)
*H01M 50/105* (2021.01)

(52) U.S. Cl.
CPC ..... *H01M 10/4228* (2013.01); *G01M 3/3209* (2013.01); *G01M 3/3218* (2013.01);
(Continued)

(58) Field of Classification Search
CPC .. H01M 10/00; H01M 10/42; H01M 10/4228; H01M 10/4285; H01M 50/105;
(Continued)

(56) References Cited

U.S. PATENT DOCUMENTS

| | | |
|---|---|---|
| 5,327,784 A | 7/1994 | Venkatesan et al. |
| 2015/0155603 A1 | 6/2015 | Tsukui |

(Continued)

FOREIGN PATENT DOCUMENTS

| | | |
|---|---|---|
| CN | 109142562 A | 1/2019 |
| CN | 210893580 U | 6/2020 |

(Continued)

OTHER PUBLICATIONS

JP-2004047652-A Machine Translation (Year: 2004).*
KR-20130054841-A Machine Translation (Year: 2013).*

*Primary Examiner* — Nguyen Q. Ha
(74) *Attorney, Agent, or Firm* — Bryan Cave Leighton Paisner LLP

(57) ABSTRACT

A battery case analyzing apparatus includes a sealing portion which covers an injection hole formed on an upper side of a battery case. The sealing portion includes a lower side contacting the upper side of the battery case, a gas injection passage, and a vacuum forming passage formed in the sealing portion. The apparatus includes a gas injection line which is connected to an inlet of the gas injection passage formed on an upper side of the sealing portion, a vacuum forming line which is connected to an outlet of the vacuum forming passage formed on the upper side of the sealing portion, a gas supply portion configured to inject gas into the battery case through the gas injection line, and a vacuum pump which is connected to the vacuum forming line to form a vacuum in a vacuum forming groove formed on the lower side of the sealing portion.

11 Claims, 2 Drawing Sheets

(52) U.S. Cl.
CPC ..... *G01M 3/3272* (2013.01); *H01M 10/4285* (2013.01); *H01M 50/105* (2021.01)

(58) Field of Classification Search
CPC ........ G01M 3/00; G01M 3/32; G01M 3/3209; G01M 3/3218; G01M 3/3272
See application file for complete search history.

(56) References Cited

U.S. PATENT DOCUMENTS

| | | |
|---|---|---|
| 2021/0020997 A1 | 1/2021 | Lee et al. |
| 2021/0172827 A1 | 6/2021 | Hwang et al. |
| 2021/0218107 A1 | 7/2021 | Hwang et al. |
| 2021/0344055 A1 | 11/2021 | Hwang et al. |

FOREIGN PATENT DOCUMENTS

| | | | | |
|---|---|---|---|---|
| JP | 2004047652 A | * | 2/2004 | ......... H01L 21/3065 |
| JP | 3996002 B2 | | 10/2007 | |
| JP | 5790604 B2 | | 10/2015 | |
| JP | 2019-039772 A | | 3/2019 | |
| KR | 20130054841 A | * | 5/2013 | .............. G01M 3/26 |
| KR | 10-2017-0041103 A | | 4/2017 | |
| KR | 10-2017-0042082 A | | 4/2017 | |
| KR | 10-2019-0107933 A | | 9/2019 | |
| KR | 10-2020-0005983 A | | 1/2020 | |
| KR | 10-2154900 A | | 9/2020 | |
| KR | 10-2020-0125194 A | | 11/2020 | |
| KR | 10-2020-0128882 A | | 11/2020 | |
| KR | 10-2021-0071330 A | | 6/2021 | |

* cited by examiner

APPARATUS FOR ANALYZING BATTERY CASE

CROSS-REFERENCE TO RELATED APPLICATION

This application is a National Phase entry pursuant to 35 U.S.C. 371 of International Application No. PCT/KR2022/010954 filed on Jul. 26, 2022, which claims priority to and the benefit of Korean Patent Application No. 10-2021-0100278 filed on Jul. 30, 2021, the entire disclosure of which is incorporated herein by reference for all purposes.

TECHNICAL FIELD

The present disclosure relates to a battery case analyzing apparatus, and to a battery case analyzing apparatus for analyzing durability of a battery case.

BACKGROUND

Secondary batteries are being produced in a way to store battery materials (positive electrodes, negative electrodes, electrolytes, separators, etc.) through a packaging container method using various cases such as a pouch type and a can type. The side reaction of a battery may be suppressed thereby, by blocking reactions of external moisture and oxygen.

However, in the battery, gas is generated as organic compounds such as electrolytes are decomposed by electrochemical and thermodynamic reactions. At this point, if excess gas is generated, the pressure inside the battery case rises due to the generated gas exceeding the capacity that the inside of the battery case is able to hold, which may lead to swelling as well as venting at a sealed portion in the battery case.

Since these phenomena cause a significant effect on performance maintenance of the battery, analyses are needed for changes in the internal pressure of the battery case due to difference in the amount of gas inside the battery case as well as for an available capacity of gas and pressure limit for the battery case. Such analysis data may be applied as important judgment and evaluation data in designing the battery case.

When it comes to measurement of the pressure limit of the battery case, a considerable amount of time may be consumed to measure the pressure limit using gas that is spontaneously generated inside the battery case. Therefore, it is possible to measure the pressure limit of the battery case by injecting gas from the outside of the battery.

Various technologies are being applied for injecting gas into the battery case from the outside. However, difficulty lies in simulating the status condition of actual batteries and analyzing gas volume and pressure changes in real time by injecting gas into the battery case without leakage (less than 0 ppm).

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY

The present disclosure relates to a battery case analyzing apparatus, and to a battery case analyzing apparatus for analyzing durability of a battery case.

Technical objects to be achieved by the present disclosure are not limited to the technical problems mentioned above, and other technical objects not mentioned will be clearly understood from the description below by those of ordinary skill in the art to which the present disclosure pertains.

A battery case analyzing apparatus of the present disclosure may include: a sealing portion which covers an injection hole formed on an upper side of a battery case, the sealing portion comprising a lower side contacting the upper side of the battery case, a gas injection passage, and a vacuum forming passage formed in the sealing portion; a gas injection line which is connected to an inlet of the gas injection passage formed on an upper side of the sealing portion; a vacuum forming line which is connected to an outlet of the vacuum forming passage formed on the upper side of the sealing portion; a gas supply portion configured to inject gas into the battery case through the gas injection line; and a vacuum pump which is connected to the vacuum forming line to form a vacuum in a vacuum forming groove formed on the lower side of the sealing portion.

In other aspects, a battery case apparatus described herein may include one or more of the following features. An outlet of the gas injection passage may face the injection hole. The outlet may be formed on the lower side of the sealing portion. A first sealing groove which is formed in a ring shape may have a first inner diameter greater than a diameter of the injection hole and a diameter of the outlet of the gas injection passage. The first sealing groove may be formed on the lower side of the sealing portion. A first sealing member may be inserted into the first sealing groove. The vacuum forming groove which is formed in the ring shape may have a second inner diameter greater than an outer diameter of the first sealing groove. An inlet of the vacuum forming passage may be connected to the vacuum forming groove. A second sealing groove which is formed in the ring shape may have a third inner diameter greater than an outer diameter of the vacuum forming groove. A second sealing member is inserted into the second sealing groove. The second sealing groove may be formed on the lower side of the sealing portion. The first sealing member and the second sealing member of the battery case analyzing apparatus of the present disclosure may be O-rings. The battery case analyzing apparatus of present disclosure may further include an upper jig coming in close contact with the upper side of the battery case; a lower jig coming in close contact with the lower side of the battery case; and a fixing portion configured to fix a relative position of the upper jig and the lower jig. An insertion hole penetrating the upper jig in a vertical direction may be formed in the upper jig, and the sealing portion may be inserted into the insertion hole. A flange portion may be mounted on an upper side of the upper jig. The flange portion may partially cover up the insertion hole. A part of a lower side of the flange portion may face a part of the upper side of the sealing portion. The lower side of the flange portion and the upper side of the sealing portion may be spaced apart from each other by a predetermined distance in the vertical direction. A pressure gauge may be provided in the gas injection line of the battery case analyzing apparatus of the present disclosure, and the pressure gauge may measure an internal pressure of the battery case. The vacuum pump may stop operating when a pressure value measured by the pressure gauge is greater than or equal to a set pressure value. A distance between the lower side of the flange portion and the upper side of the sealing portion may be 0.2 mm to 1 mm. The battery case analyzing apparatus of the present disclosure may further include an oven portion which accommodates the battery case, the upper jig, the lower jig, and the sealing portion in a heating space therein and a temperature of the heating space may be controlled. The gas injection line of the battery case analyzing apparatus of the present disclosure may be provided with a mass flow controller which is controls an amount of the gas injected into the battery case.

According to a battery case apparatus of the present disclosure, even if flatness of the surface of a battery case is varied as the battery case is deformed during battery case analysis, it is possible to firmly maintain sealing between the battery case and a gas injection line.

According to a battery case apparatus of the present disclosure, it is possible to minimize the time consumed by preparation of analysis because the sealing between the battery case and the gas injection line is attainable within a short amount of time.

According to a battery case apparatus of the present disclosure, it is possible to minimize human errors and deformation of the battery case owing to process simplification.

According to a battery case apparatus of the present disclosure, it is possible to prevent the failure of the apparatus due to reverse flow of electrolyte by blocking the reverse flow of electrolyte.

According to a battery case analyzing apparatus of the present disclosure, it is possible to analyze a pressure change according to the amount of gas inside the battery case in real time while injecting a certain amount of gas into the battery case and enable pressure measurement and analysis upon the occurrence of an event such as venting that takes place when the inside of the battery case reaches a certain pressure limit to cause the breakage of a fused portion.

The effects of the present disclosure are not limited to the effects mentioned above and additional other effects not described above will be clearly understood from the description of the appended claims by those skilled in the art.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION

Figure 1:
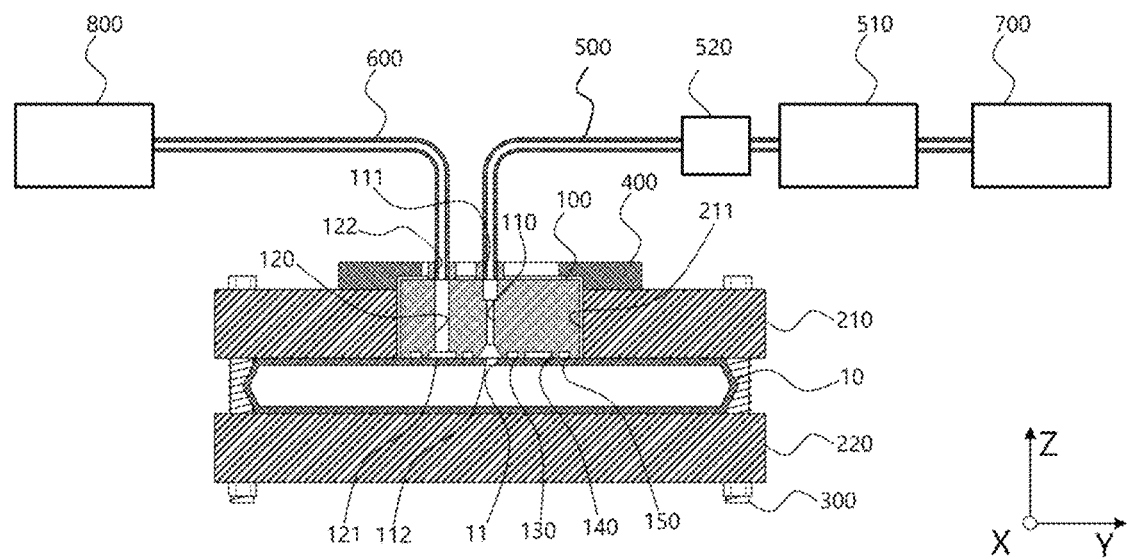
FIG. 1 is a cross-sectional view illustrating a battery case analyzing apparatus of the present disclosure.

A battery case analyzing apparatus of the present disclosure may include:
a sealing portion which covers an injection hole formed on an upper side of a battery case and has a lower side coming in close contact with the upper side of the battery case, a gas injection passage and a vacuum forming passage being formed therein; a gas injection line which is connected to an inlet of the gas injection passage formed on an upper side of the sealing portion; a vacuum forming line which is connected to an outlet of the vacuum forming passage formed on the upper side of the sealing portion; a gas supply portion configured to inject gas into the battery case through the gas injection line; and a vacuum pump which is connected to the vacuum forming line to form a vacuum in a vacuum forming groove formed on the lower side of the sealing portion.

Formed on the lower side of the sealing portion of the battery case analyzing apparatus of the present disclosure may be an outlet of the gas injection passage facing the injection hole, a first sealing groove which is formed in a ring shape having an inner diameter greater than diameters of the injection hole and the outlet of the gas injection passage and into which a first sealing member is inserted, the vacuum forming groove which is formed in a ring shape having an inner diameter greater than an outer diameter of the first sealing groove and to which an inlet of the vacuum forming passage is connected, and a second sealing groove which is formed in a ring shape having an inner diameter greater than an outer diameter of the vacuum forming groove and into which a second sealing member is inserted.

The first sealing member and the second sealing member of the battery case analyzing apparatus of the present disclosure may be O-rings.

The battery case analyzing apparatus of present disclosure may further include an upper jig coming in close contact with the upper side of the battery case; a lower jig coming in close contact with the lower side of the battery case; and a fixing portion configured to fix a relative position of the upper jig and the lower jig.

In the battery case analyzing apparatus of the present disclosure, an insertion hole penetrating the upper jig in a vertical direction may be formed in the upper jig, and the sealing portion may be inserted into the insertion hole.

Mounted on an upper side of the upper jig of the battery case analyzing apparatus of the present disclosure may be a flange portion which partially covers up the insertion hole and of which a part of a lower side faces a part of the upper side of the sealing portion.

In the battery case analyzing apparatus of the present disclosure, the lower side of the flange portion and the upper side of the sealing portion may be spaced apart from each other by a predetermined distance in the vertical direction.

A pressure gauge may be provided in the gas injection line of the battery case analyzing apparatus of the present disclosure, and the pressure gauge may measure an internal pressure of the battery case.

In the battery case analyzing apparatus of the present disclosure, the vacuum pump may stop operating when a pressure value measured by the pressure gauge is greater than or equal to a set pressure value.

In the battery case analyzing apparatus of the present disclosure, a distance between the lower side of the flange portion and the upper side of the sealing portion may be 0.2 mm to 1 mm.

The battery case analyzing apparatus of the present disclosure may further include an oven portion which accommodates the battery case, the upper jig, the lower jig, and the sealing portion in a heating space therein and a temperature of the heating space may be controlled.

The gas injection line of the battery case analyzing apparatus of the present disclosure may be provided with a mass flow controller which is controls an amount of the gas injected into the battery case.

Hereinafter, example embodiments according to the present disclosure will be described in detail with reference to the accompanying drawings. Here, the size or shape of components shown in the drawings may be exaggerated for clarity and convenience of explanation. In addition, terms specifically defined in consideration of configurations and operations of the present disclosure may vary depending on the intention or custom of a user or operator. Definitions of these terms should be made based on the context throughout this specification.

In the description of the present disclosure, it should be noted that orientation or positional relationships indicated by the terms such as "center", "upper", "lower", "left", "right", "vertical", "horizontal", "inside", "outside", "one side", and "the other side" are based on orientation or positional relationships shown in the drawings or orientation or positional relationships usually of disposition when a product according to the present disclosure is used, are merely for the description and brief illustration the present disclosure, and should not be construed as limiting the present disclosure because they are not suggesting or implying that the indicated apparatus or element must be configured or operated in the specified orientation with the specified orientation.

Figure 2:
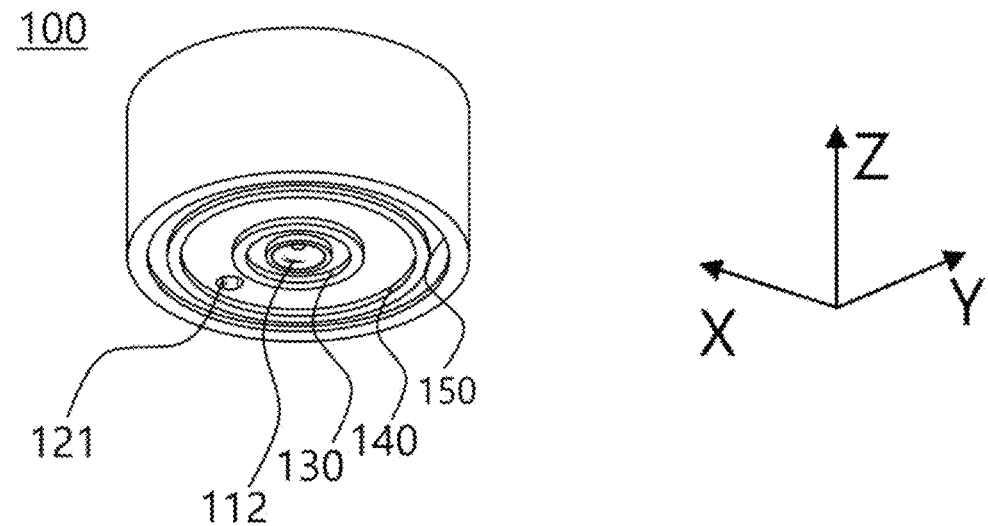
FIG. 2 is a perspective view illustrating a sealing portion.
Figure 3:
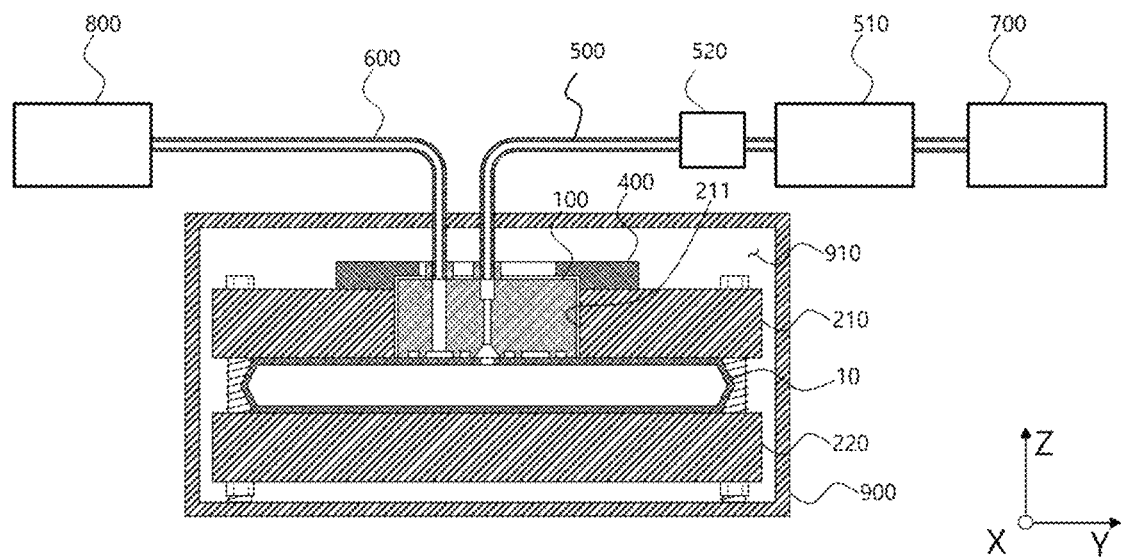
FIG. 3 is a cross-sectional view illustrating another example embodiment of a battery case analyzing apparatus of the present disclosure.
Figure 4:
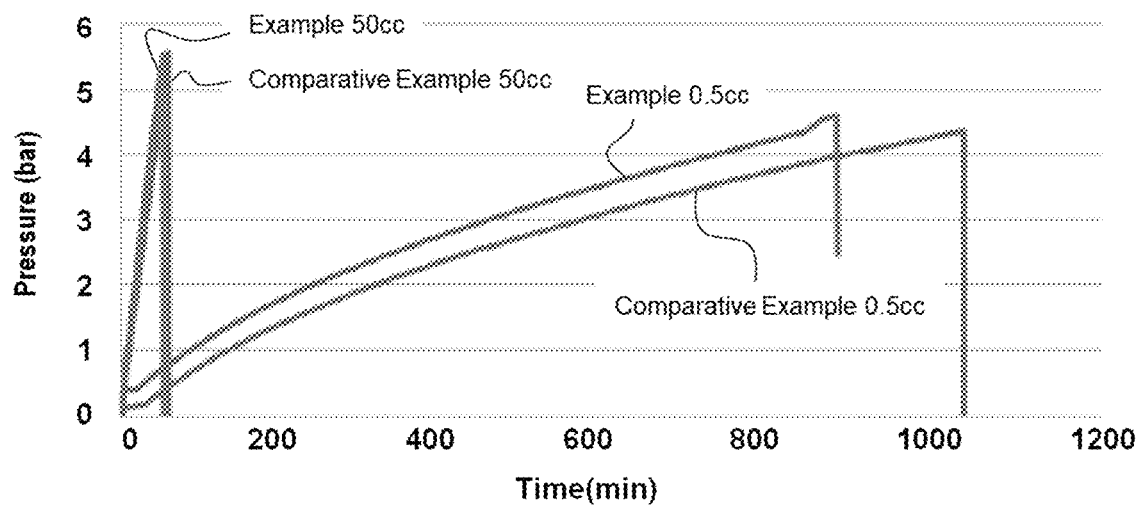
FIG. 4 is a graph illustrating a result of analyzing a battery case.

FIG. 1 is a cross-sectional view illustrating a battery case analyzing apparatus of the present disclosure. FIG. 2 is a perspective view illustrating a sealing portion 100. FIG. 3 is a cross-sectional view illustrating another example embodiment of the battery case analyzing apparatus of the present disclosure. FIG. 4 is a graph illustrating a result of analyzing a battery case 10.

Hereinafter, a battery case analyzing apparatus of the present disclosure will be described in detail with reference to FIGS. 1 to 4.

The battery case analyzing apparatus of the present disclosure may be configured to analyze durability of the battery case 10. Gas may be spontaneously generated inside the battery, which may cause an increase in internal pressure of the battery case 10. Therefore, it may be important for the stable operation of a battery to figure out the amount of gas generated inside the battery case 10 and durability of the battery case 10 in accordance with the pressure rise.

The battery case analyzing apparatus of the present disclosure may be configured to inject gas into the battery case 10 and analyze changes in pressure due to injected gas as well as the time of deformation or breakage of the battery case 10.

The battery case analyzing apparatus of the present disclosure may be used, without limitation, in a pouch-type battery, a prismatic battery, a cylindrical battery, or a coin-type battery. The battery case analyzing apparatus of the present disclosure may be more advantageous in analyzing a pouch-type battery case 10 that the battery case 10 is made of a flexible material such as an aluminum sheet. The battery case analyzing apparatus of the present disclosure may maintain airtightness even under condition in which the surface of the battery case 10 is deformed during analysis. In addition, when the sealing between a gas injection passage 110 and the battery case 10 is damaged, it may be detected immediately, such that stable analysis of the battery case 10 may be possible.

As shown in FIG. 1, the battery case analyzing apparatus of the present disclosure may include the sealing portion 100 which covers an injection hole 11 formed on the upper side of the battery case 10 and has the lower side coming in close contact with the upper side of the battery case 10, the gas injection passage 110 and a vacuum forming passage 120 being formed therein; a gas injection line 500 which is connected to an inlet 111 of the gas injection passage formed on the upper side of the sealing portion 100; a vacuum forming line 600 which is connected to an outlet 122 of the vacuum forming passage formed on the upper side of the sealing portion 100; a gas supply portion 700 which is configured to inject gas into the battery case through the gas injection line 500; and a vacuum pump 800 which is connected to the vacuum forming line 600 to form a vacuum in a vacuum forming groove 140 formed on the lower side of the sealing portion 100.

Before the battery case analyzing apparatus is mounted on the battery case 10, the injection hole 11 configured to inject gas into the battery case 10 may be formed. The injection hole 11 may be formed by punching or the like.

The gas injection line 500 or the vacuum forming line 600 may be provided in the form of a tube including one or more components of Teflon, SUS, PP, and PE. The vacuum forming line 600 may be made of a material having a certain level of rigidity.

The gas injection line 500 may be provided with a mass flow controller 510 configured to control the amount of the gas injected into the battery case 10. Specifically, a mass flow controller 510 is provided downstream of the gas supply portion 700 to control the amount of the gas of which the gas supply portion 700 supplies into the battery case 10.

A pressure gauge 520 may be provided in the gas injection line 500. The pressure gauge 520 may be provided downstream of the mass flow controller 510 to measure the internal pressure of the battery case 10.

In the battery case analyzing apparatus of the present disclosure, the vacuum pump may stop operating when the pressure value measured by the pressure gauge 520 is greater than or equal to a set pressure value. In the case of a flexible battery case 10 such as pouch-type battery cases, the battery case 10 may expand when internal pressure increases. At this time, since the flange portion 400 presses the sealing portion 100, the sealing may be maintained even if the vacuum pump 800 does not operate. Therefore, when it is greater than or equal to the set pressure, the sealing portion 100 comes completely in close contact with the battery case 10 due to the expansion of the battery case 10 and normal force received from the flange portion 400, and the sealing between the gas injection line 500 and the injection hole 11 may be maintained even when a vacuum is not formed in the vacuum forming groove 140 with the vacuum pump 800.

In addition, by releasing the vacuum in the vacuum forming groove 140 in advance, when a leak occurs in the battery case 11 at the pressure limit (a point at which the internal pressure of the battery case rapidly drops) that is the analysis point, the sealing between the gas injection line 500 and injection hole 11 is also naturally released, such that the pressure limit may be detected with higher sensitivity.

The gas supply portion 700 may be a gasbombe. The gas supply portion 700 may supply inert gas or gas that may be generated inside the battery. For example, the gas supply portion 700 may supply gas selected from the group consisting of He, $CO_2$, and combinations thereof to the battery case 10.

The vacuum pump 800 may be configured to suck in gas between the lower side of the sealing portion 100 and the upper side of the battery case 10 to bring the lower side of the sealing portion 100 and the upper side of the battery case 10 into close contact with each other. The vacuum pump 800 may be a rotary vane pump, a rotary piston pump, a rotary gear pump, a piston pump, a diaphragm pump, a Roots pump, a water seal type pump, a turbomolecular pump, a diffusion pump, an ejecta pump, an adsorption pump, an ion pump, a getter pump, a sublimation pump, and a low-temperature cooling pump.

The gas injection passage 110 and the vacuum forming passage 120 may be formed inside the sealing portion 100. The gas injection passage 110 and the vacuum forming passage 120 may be provided in a shape extending in the vertical direction.

Specifically, the inlet 111 of the gas injection passage may be located on the upper side of the sealing portion 100, and the outlet may be located on the lower side of the sealing portion 100. More specifically, an outlet 112 of the gas injection passage may be located further inside than the inner periphery of the vacuum forming groove 140 formed in a ring shape. The outlet 112 of the gas injection passage may face the injection hole 11 formed in the battery case 10, and gas discharged through the outlet 112 of the gas injection passage may be injected into the battery case 10 through the injection hole 11. A gas injection line 500 may be connected to the inlet 111 of the gas injection passage.

The inlet 121 of the vacuum forming passage may be formed in the vacuum forming groove 140. Accordingly, when the vacuum pump 800 starts sucking, negative pressure may be generated in the vacuum forming groove 140 through the vacuum forming passage 120. The outlet 122 of the vacuum forming passage may be located on the upper side of the sealing portion 100, and the vacuum forming line 600 may be connected.

As shown in FIGS. 1 and 2, formed on the lower side of the sealing portion 100 may be the outlet 112 of the gas injection passage facing the injection hole 11, a first sealing groove 130 which is formed in a ring shape having an inner diameter greater than diameters of the injection hole 11 and the outlet 112 of the gas injection passage and into which a first sealing member is inserted, a vacuum forming groove 140 which is formed in a ring shape having the inner diameter greater than the outer diameter of the first sealing groove 130 and to which the inlet 121 of the vacuum forming passage is connected, and a second sealing groove 150 which is formed in a ring shape having the inner diameter greater than the outer diameter of the vacuum forming groove 140 and into which the second sealing member is inserted.

In other words, the vacuum forming groove 140 may be located inside the inner periphery of the second sealing groove 150, the first sealing groove 130 may be located inside the inner periphery of the vacuum forming groove 140, and the inlet 121 of the vacuum forming passage may be located inside the inner periphery of the first sealing groove 130. Accordingly, when a negative pressure is generated in the vacuum forming groove 140, the first sealing member and the second sealing member located in the first sealing groove 130 and the second sealing groove 150 may come into close contact with the upper side of the battery case 10, and sealing may be formed between the injection hole 11 and the gas injection passage 110. The battery case analyzing apparatus of the present disclosure may form the sealing between the injection hole 11 and the gas injection passages 110 simply and quickly by turning on the vacuum pump 800 after bringing the sealing portion 100 into close contact with the battery case 10.

The first sealing member and the second sealing member may be O-rings. The first sealing member and the second sealing member may be provided in a shape corresponding to the first sealing groove 130 and the second sealing groove 150, respectively.

As shown in FIG. 1, the battery case analyzing apparatus of the present disclosure may further include an upper jig 210 coming in close contact with the upper side of the battery case 10; a lower jig 220 coming in close contact with the lower side of the battery case 10; and a fixing portion 300 configured to fix the relative positions of the upper jig 210 and the lower jig 220. The upper jig 210 may be formed with an insertion hole 211 which penetrates the upper jig 210 in the vertical direction, and the sealing portion 100 may be inserted into the insertion hole 211.

The upper jig 210 and the lower jig 220 may be provided in a plate shape having a plane perpendicular to the vertical direction.

For example, the sealing portion 100 is provided in a cylindrical shape taking a vertical direction as a central axis, and may be inserted into the insertion hole 211 of the upper jig 210 provided in a shape corresponding thereto.

The fixing portion 300 may be a bolt and a nut and inserted into a fixing hole formed in the upper jig 210 and the lower jig 220.

The upper jig 210 may press the upper side of the battery case by being combined with the lower jig 220. At this time, to make the gas injected into the injection hole 11 diffused throughout the battery case, the lower side of the upper jig 210 may be formed with a ventilation groove (not shown) connected from a lower inlet of the insertion hole 211 to a lower edge of the upper jig 210.

Mounted on the upper side of the upper jig 210 may be a flange portion 400 which is configured to partially cover the insertion hole 211 and of which a part of the lower side faces a part of the upper side of the sealing portion 100. Specifically, the flange portion 400 may be formed in a ring-shaped plate. The diameter of the inner periphery of the flange portion 400 may be formed to be smaller than the diameter of the inlet of the insertion hole 211, and the diameter of the outer periphery of the flange portion 400 may be formed to be greater than the diameter of the inlet of the insertion hole 211. The gas injection line 500 and the vacuum forming line 600 may pass through the inner periphery of the flange portion 400 to be connected to the sealing portion 100. Therefore, it may be desirable that the inlet 111 of the gas injection passage and the outlet 122 of the vacuum forming passage are located at a position facing the inner periphery of the flange portion 400.

A ring-shaped step may be provided on the lower side of the flange portion 400. The diameter of the step may be the same as that of the inlet of the insertion hole 211. The lower side of the flange portion 400 on the inner circle formed by the step may be higher than the lower side of the outer circle. In other words, based on the step, the inner side may face the upper side of the sealing portion 100, and the outer side may be combined with the upper side of the upper jig 210.

The lower side of the flange portion 400 and the upper side of the sealing portion 100 may be spaced apart from each other by a predetermined distance in the vertical direction. Specifically, in a state before gas is injected into the battery case 10, an empty space may be formed between the two sides so that the lower side of the flange portion 400 does not touch the upper side of the sealing portion 100. For example, before injecting gas into the battery case 10, which is a point at which the battery case 10 expands, once the flange portion 400 completely comes in close contact with the upper side of the sealing portion 100 to pressurize the sealing portion 100, the inner side of the battery case 10 comes in close contact with an electrode assembly inside. In particular, since the first sealing member and the second sealing member are provided in a closed loop shape, the gas injected into the injection hole 11 may not be diffused into the battery case 10.

Therefore, before injecting the gas into the battery case 10, in an attempt to prevent the sealing portion 100 from pressurizing the upper side of the battery case 10 together with the upper jig 210, the lower side of the flange portion 400 and the upper side of the sealing portion 100 may be spaced apart by a predetermined distance in the vertical direction. The separation distance between the lower side of the flange portion 400 and the upper side of the sealing portion 100 may be 0.2 mm to 1 mm. For example, the separation distance between the lower side of the flange portion 400 and the upper side of the sealing portion 100 may be 0.5 mm.

As shown in FIG. 3, the battery case analyzing apparatus of the present disclosure may further include an oven portion 900 which is configured to accommodate the battery case 10, the upper jig 210, the lower jig 220, and the sealing portion 100 in an internal heating space 910 and in which the temperature of the internal heating space 910 is controlled. The inside of the oven portion 900 may include a battery and accommodate the battery case 10, the upper jig 210, the lower jig 220, and the sealing portion 100, and the gas supply portion 700, the vacuum pump 800, the mass flow controller 510, and the pressure gauge 520 may be located outside the oven portion 900. The oven portion 900 may be a chamber type oven that forms a heating space 910 therein.

EXAMPLES

Using the battery case analyzing apparatus of the present disclosure, He gas was injected into the two aluminum pouch-type battery cases 10 at flow rates of 50 cc/min and 0.5 cc/min, respectively.

Comparative Examples

By sealing a gap between the gas injection line 500 and the battery case 10 using a hardener, He gas was injected into the two aluminum pouch-type battery cases 10 at flow rates of 50 cc/min and 0.5 cc/min, respectively.

FIG. 4 is a graph illustrating analysis results of Examples and Comparative Examples. As shown in FIG. 4, it is noted that, at a slow injection rate of 0.5 cc/min, the analysis of the battery case 10 using the battery case analyzing apparatus of the present disclosure reaches the pressure limit more quickly. This indicates that the battery case analyzing apparatus of the present disclosure better maintains the airtightness between the battery case 10 and the gas injection line 500.

Although the example embodiments according to the present disclosure have been described above, these are merely exemplary, and those skilled in the art will understand that various modifications and equivalent ranges of the example embodiments are possible therefrom. Accordingly, the scope for true technical protection of the present disclosure should be defined by the appended claims.

DESCRIPTION OF SYMBOLS

10 . . . Battery case 11 . . . Injection hole
100 . . . Sealing portion 110 . . . Gas injection passage
111 . . . Inlet of gas injection passage 112 . . . Outlet of gas injection passage
120 . . . Vacuum forming passage 121 . . . Inlet of vacuum forming passage
122 . . . Outlet of vacuum forming passage 130 . . . First sealing groove
140 . . . Vacuum forming groove 150 . . . Second sealing groove
210 . . . Upper jig 211 . . . Insertion hole
220 . . . Lower jig 300 . . . Fixing portion
400 . . . Flange portion 500 . . . Gas injection line
510 . . . Mass flow controller 600 . . . Vacuum forming line
700 . . . Gas supply portion 800 . . . Vacuum pump
900 . . . Oven portion 910 . . . Heating space Industrial Applicability According to a battery case apparatus of the present disclosure, even if flatness of the surface of a battery case is varied as the battery case is deformed during battery case analysis, it is possible to firmly maintain sealing between the battery case and a gas injection line.

According to a battery case apparatus of the present disclosure, it is possible to minimize the time consumed by preparation of analysis because the sealing between the battery case and the gas injection line is attainable within a short amount of time.

According to a battery case apparatus of the present disclosure, it is possible to minimize human errors and deformation of the battery case owing to process simplification.

According to a battery case apparatus of the present disclosure, it is possible to prevent the failure of the apparatus due to reverse flow of electrolyte by blocking the reverse flow of electrolyte.

According to a battery case analyzing apparatus of the present disclosure, it is possible to analyze a pressure change according to the amount of gas inside the battery case in real time while injecting a certain amount of gas into the battery case and enable pressure measurement and analysis upon the occurrence of an event such as venting that takes place when the inside of the battery case reaches a certain pressure limit to cause the breakage of a fused portion.

The invention claimed is:

1. A battery case analyzing apparatus, comprising:
    a sealing portion which covers an injection hole formed on an upper side of a battery case, the sealing portion comprising a lower side contacting the upper side of the battery case, a gas injection passage and a vacuum forming passage formed in the sealing portion;
    a gas injection line which is connected to an inlet of the gas injection passage and formed on an upper side of the sealing portion;
    a vacuum forming line which is connected to an outlet of the vacuum forming passage and formed on the upper side of the sealing portion;
    a gas supply portion configured to inject gas into the battery case through the gas injection line; and
    a vacuum pump which is connected to the vacuum forming line to form a vacuum in a vacuum forming groove formed on the lower side of the sealing portion.

2. The battery case analyzing apparatus of claim 1, further comprising:
    an outlet of the gas injection passage facing the injection hole, the outlet being formed on the lower side of the sealing portion;
    a first sealing groove which is formed in a ring shape having a first inner diameter greater than a diameter of the injection hole and a diameter of the outlet of the gas injection passage,
        wherein the first sealing groove is formed on the lower side of the sealing portion, and
        wherein a first sealing member is inserted into the first sealing groove;
    the vacuum forming groove which is formed in the ring shape having a second inner diameter greater than an outer diameter of the first sealing groove, wherein an inlet of the vacuum forming passage is connected to the vacuum forming groove, and wherein the vacuum forming groove is formed on the lower side of the sealing portion; and a second sealing groove which is formed in the ring shape having a third inner diameter greater than an outer diameter of the vacuum forming groove, wherein a second sealing member is inserted into the second sealing groove, and wherein the second sealing groove is formed on the lower side of the sealing portion.

3. The battery case analyzing apparatus of claim 2, wherein the first sealing member and the second sealing member are O-rings.

4. The battery case analyzing apparatus of claim 1, further comprising:

an upper jig contacting the upper side of the battery case;

a lower jig contacting the lower side of the battery case; and a fixing portion configured to fix a relative position of the upper jig and the lower jig, wherein an insertion hole penetrating the upper jig in a vertical direction is formed in the upper jig, and wherein the sealing portion is inserted into the insertion hole.

5. The battery case analyzing apparatus of claim 4, wherein a flange portion is mounted on an upper side of the upper jig, wherein the flange portion partially covers up the insertion hole, and wherein a part of a lower side of the flange portion faces a part of the upper side of the sealing portion.

6. The battery case analyzing apparatus of claim 5, wherein the lower side of the flange portion and the upper side of the sealing portion are spaced apart from each other by a predetermined distance in the vertical direction.

7. The battery case analyzing apparatus of claim 6, wherein a pressure gauge is provided in the gas injection line, and wherein the pressure gauge measures an internal pressure of the battery case.

8. The battery case analyzing apparatus of claim 7, wherein the vacuum pump stops operating when a pressure value measured by the pressure gauge is greater than or equal to a set pressure value.

9. The battery case analyzing apparatus of claim 6, wherein a distance between the lower side of the flange portion and the upper side of the sealing portion is 0.2 mm to 1 mm.

10. The battery case analyzing apparatus of claim 4, further comprising:

an oven portion which accommodates the battery case, the upper jig, the lower jig, and the sealing portion in a heating space therein, wherein a temperature of the heating space is controlled.

11. The battery case analyzing apparatus of claim 1, wherein the gas injection line is provided with a mass flow controller which controls an amount of the gas injected into the battery case.

* * * * *